United States Patent
Zhang (10) Patent No.: US 8,762,371 B1
(45) Date of Patent: Jun. 24, 2014

(54) SYSTEM AND METHODS AND USER INTERFACE FOR SEARCHING DOCUMENTS BASED ON CONCEPTUAL ASSOCIATION

(71) Applicant: Guangsheng Zhang, Palo Alto, CA (US)

(72) Inventor: Guangsheng Zhang, Palo Alto, CA (US)

( * ) Notice: Subject to any disclaimer, the term of this patent is extended or adjusted under 35 U.S.C. 154(b) by 0 days.

(21) Appl. No.: 13/751,120

(22) Filed: Jan. 27, 2013

Related U.S. Application Data (63) Continuation of application No. 13/399,050, filed on Feb. 17, 2012, now Pat. No. 8,370,347, which is a continuation of application No. 12/699,193, filed on Feb. 3, 2010, now Pat. No. 8,140,526.

(60) Provisional application No. 61/160,625, filed on Mar. 16, 2009.

(51) Int. Cl.
*G06F 7/02* (2006.01)
*G06F 17/30* (2006.01)

(52) U.S. Cl.
CPC .... *G06F 17/30864* (2013.01); *G06F 17/30424* (2013.01); *G06F 17/30321* (2013.01); *G06F 17/30327* (2013.01)
USPC ........... 707/730; 707/728; 707/731; 707/748; 707/750; 707/758

(58) Field of Classification Search
CPC .................. G06F 17/30864; G06F 17/30424; G06F 17/30321; G06F 17/30327
See application file for complete search history.

(56) References Cited

U.S. PATENT DOCUMENTS

| | | | |
|---|---|---|---|
| 5,930,788 A | 7/1999 | Wical | |
| 6,101,515 A | 8/2000 | Wical | |
| 6,487,545 B1 | 11/2002 | Wical | |
| 6,701,310 B1* | 3/2004 | Sugiura et al. | 1/1 |
| 6,745,183 B2* | 6/2004 | Yamaguchi et al. | 1/1 |
| 2003/0115191 A1* | 6/2003 | Copperman et al. | 707/3 |
| 2003/0149704 A1 | 8/2003 | Yayoi et al. | |
| 2005/0192934 A1* | 9/2005 | Ellis et al. | 707/3 |
| 2005/0240576 A1 | 10/2005 | Piscitello et al. | |
| 2009/0157720 A1 | 6/2009 | Kolcz et al. | |
| 2012/0158633 A1 | 6/2012 | Eder | |

\* cited by examiner

*Primary Examiner* — Bruce Moser (57) ABSTRACT

A system and methods and user interface are disclosed for searching documents based on conceptual association, and for ranking documents based on content characteristics. A computer processing system receives a query containing a word or phrase that is a name of an object or concept, and can also receive a value for a customized ranking parameter. A computer storage device stores a dataset related to the object or concept name, wherein the dataset includes a plurality of property names and can also include association-strength values. A computer processing system can count a first frequency of a first property name and count a second frequency of a second property name in a document containing text in a natural language, calculate a relevance score as a function of the first frequency and the second frequency, and rank the plurality of documents using their respective relevance scores, and return one or more documents to the user based on the ranking of the plurality of documents. The function is in part defined by the customized ranking parameter.

20 Claims, 6 Drawing Sheets

SYSTEM AND METHODS AND USER INTERFACE FOR SEARCHING DOCUMENTS BASED ON CONCEPTUAL ASSOCIATION

CROSS REFERENCES TO RELATED APPLICATIONS

The present application is a continuation application of and claims priority to U.S. patent application Ser. No. 13/399,050, titled "System and Methods for Ranking Documents Based on Content Characteristics", filed by the present inventor on Feb. 17, 2012. U.S. patent application Ser. No. 13/399,050 is a continuation application of and claims priority to U.S. patent application Ser. No. 12/699,193, titled "System and methods for ranking documents based on content characteristics", filed by the same inventor on Feb. 3, 2010. U.S. patent application Ser. No. 12/699,193 further claims priority to Provisional Patent Application 61/160,625, titled "System, methods, user interface, and article of manufacture for scalable knowledge-based document topic discovery, content recognition, search, ranking, and categorization" filed on Mar. 16, 2009 by the present inventor. The disclosures of the above applications are incorporated herein by reference.

BACKGROUND OF INVENTION

In information search and retrieval, a large number of results are often returned in response to a query. Even if all the documents are relevant to the query, the user still faces a problem of finding what is the most relevant or needed information from a large number of candidates. Sometimes, a user may only need a brief overview of the queried topic, while other times the user may want to look for detailed information about the queried topic. Sometimes a user may only need information about the general aspects of the queried topic, while at other times the user may want to look for information about certain specific aspects about the queried topic. The task of sifting through a long list of candidate documents can be time-consuming as well as frustrating.

For example, if the query is about cars, a search engine may return a huge amount of documents that contain information about cars. There can be documents that provide general information about what cars are and/or how they work, etc. There can also be documents about how to buy or sell a car, etc. Some document may be about specific car makes and models, some documents may be about specific properties of cars. Some documents may be a brief introduction about cars, while others may be detailed descriptions about many aspects of cars. For the same topic related to cars, such as the general information about the engines of cars, some documents may provide a brief overview; while others may go into great details and length.

Conventional search engines, whether they are used for the Internet or for an enterprise, rank returned documents mainly based on keywords or hypertext links. Even though the returned documents may be relevant to the query, there is no way to detect or distinguish the differences between the characteristics of the contents in the returned documents, such as the differences about cars as described above.

SUMMARY OF INVENTION

The present application discloses ranking methods based on a theoretical framework called the Object-Properties Associations Model for Knowledge and Linguistic Information developed by the present inventor. The ranking methods in the present disclosure compare the document content with an object-specific knowledge data set related to the query term, and detect the characteristics of the document content in relation to the query term, based on the distribution patterns of information-carrying components of the document, The knowledge about the content characteristics can then be used to provide a user with a plurality of options to meet the specific needs of the user, with user interface tools to enable the user to effectively locate the most relevant information the user is looking for.

In a general aspect, the present invention relates to a system for assessing information in natural language contents. The system includes a user interface that can receive an object name as a query term and a value for a customized ranking parameter from a user; a computer storage that can store an object-specific data set related to the object name, wherein the object-specific data set includes a plurality of property names and association-strength values, each property name being associated with an association-strength value, wherein the association strength values of the plurality of property names are above a predetermined threshold value, wherein the plurality of property names includes a first property name and a second property name, wherein the computer storage configured to store a plurality of documents containing text in a natural language; and a computer processing system in communication with the computer storage and the user interface. The computer processing system can count a first frequency of the first property name in one of the plurality of documents, count a second frequency of the second property name in the document, calculate a relevance score as a function of the first frequency and the second frequency, rank the plurality of documents using their respective relevance scores, and return one or more documents to the user based on the ranking of the plurality of documents. The function is in part defined by the customized ranking parameter.

Implementations of the system may include one or more of the following. The user interface can include a control that can receive a value for a customized ranking parameter under the operation of the user; and an area configured to display the one or more documents returned by the computer processing system based on the ranking of the plurality of documents. The control in the user interface can allow the user to customize the user's preference for different types of contents of the one or more documents returned by the computer processing system, wherein the preference comprises at least one of "general", "specific", "detailed", "brief", "query specific", or "conceptual" each of which characterizes a type of content in a document. The function can depend on the sum of a first multiplication of the first frequency and its corresponding association-strength value and a second multiplication of the second frequency and its corresponding association-strength value. The computer processing system can further separate the plurality of property names in the object-specific data set into a first group comprising the first property name and a second group comprising the second property name, wherein the property names in the first group have their respective association strength values at or above a predetermined value, wherein the property names in the second group have their respective association strength values below the predetermined value; count in the document the frequencies of the property names in the first group; and count in the document the frequencies of the property names in the second group, wherein the relevance score can be calculated using the frequencies of the property names in the first group and the frequencies of property names in the second group. The computer processing system can sum the frequencies of the property names in the first group in the document to produce a first sum and to sum the frequencies of property names in the second group in the document to produce a second sum, where the relevance score can be calculated using the first sum and the second sum. The relevance score can be calculated using the ratio of first sum to the sum of the first sum and the second sum. The computer processing system can count in the document the frequencies of the plurality of property names; sum the frequencies of property names in the document to produce a total count; and calculate the relevance score using the total count. The frequencies of the plurality of property names can be counted up to a predetermined upper bound, wherein the relevance score can be calculated using a ratio of the total count to the predetermined upper bound, wherein the total count can be set to be equal to the predetermined upper bound if the total frequencies of the plurality of property names exceed the predetermined upper bound. The first property name can be the object name, wherein the second property name is different from the object name. The computer processing system can sum the frequencies of property names that are different from the object name in the document to produce a total count, wherein the relevance score can be calculated using a ratio of the first frequency to the sum of the first frequency and the total count.

In another general aspect, the present invention relates to a method for assessing information in natural language contents. The method includes receiving an object name by a computer processing system as a query term; receiving a value for a customized ranking parameter from a user by the computer processing system; retrieving an object-specific data set related to the object name from a computer storage system, wherein the object-specific data set includes a plurality of property names and association-strength values, each property name being associated with an association-strength value, wherein the association strength values of the plurality of property names are above a predetermined threshold value, wherein the plurality of property names can include a first property name and a second property name; retrieving, by the computer processing system, a plurality of documents containing text in a natural language; counting a first frequency of the first property name in one of the plurality of documents by the computer processing system; counting a second frequency of the second property name in the document by the computer processing system; calculating a relevance score as a function of the first frequency and the second frequency, wherein the function is in part defined by the customized ranking parameter; ranking the plurality of documents using their respective relevance scores; and returning one or more documents to the user based on the ranking of the plurality of documents.

In another general aspect, the present invention relates to a method for assessing information in natural language contents. The method includes receiving an object name by a computer processing system as a query term; receiving, from a user by the computer processing system, a first value for a first customized ranking parameter and a second value for a second customized ranking parameter; retrieving an object-specific data set related to the object name from a computer storage system, wherein the object-specific data set can include a plurality of property names and association-strength values, each property name being associated with an association-strength value, wherein the association strength values of the plurality of property names are above a predetermined threshold value, wherein the plurality of property names can include a first property name and a second property name; retrieving, by the computer processing system, a plurality of documents containing text in a natural language; counting a first frequency of the first property name in one of the plurality of documents by the computer processing system; counting a second frequency of the second property name in the document by the computer processing system; calculating a relevance score as a function of the first frequency and the second frequency, wherein the function is in part defined by the first customized ranking parameter and the second customized ranking parameter; ranking the plurality of documents using their respective relevance scores; and returning one or more documents to the user based on the ranking of the plurality of documents.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION OF INVENTION

Given an object name as a search query, and the object-specific data set of a plurality of property terms and their corresponding object-dependent association strength values, the amount of information about the object in a document can be quantitatively assessed, and the quantitative measure of the information in the document can be used as a measure of the relevancy of the document to the search query for ranking the search results. Details about quantitative information assessment are disclosed in U.S. patent application Ser. No. 12/573,134, titled "System and Methods for Quantitative Assessment of Information in Natural Language Contents" filed on Oct. 4, 2009 by the present inventor, the disclosure of which is incorporated herein by reference.

However, as described above, a large number of documents can be determined to contain information relevant to an object name in a query. Documents that are determined to have the same or similar relevancy to a query can have different contents. For example, one document may contain certain amount of information about "desktop computers", and another document may contain the same amount of information about "desktop computers", but also contain additional information about "notebook computers".

When searching for information about "desktop computers", in some cases the user may or may not also want to take a look at documents that also contain information about "notebook computers". While both documents are relevant to the query, conventional search and ranking methods do not allow the user to customize the ranking order or to re-rank the results based on such document content characteristics, and it is especially a problem when the number of relevant document retrieved is large, such that certain relevant documents that are initially ranked below others for some reason may not have a chance to be moved to the top for selection.

In addition to the quantitative assessment of information contained in the document about the specific object as disclosed in the above referenced U.S. patent application Ser. No. 12/573,134, the presently disclosed system and methods can further quantitatively determine certain important characteristics of the content, thus providing tools to allow users to accurately rank and re-rank documents according to their specific needs.

Figure 1:
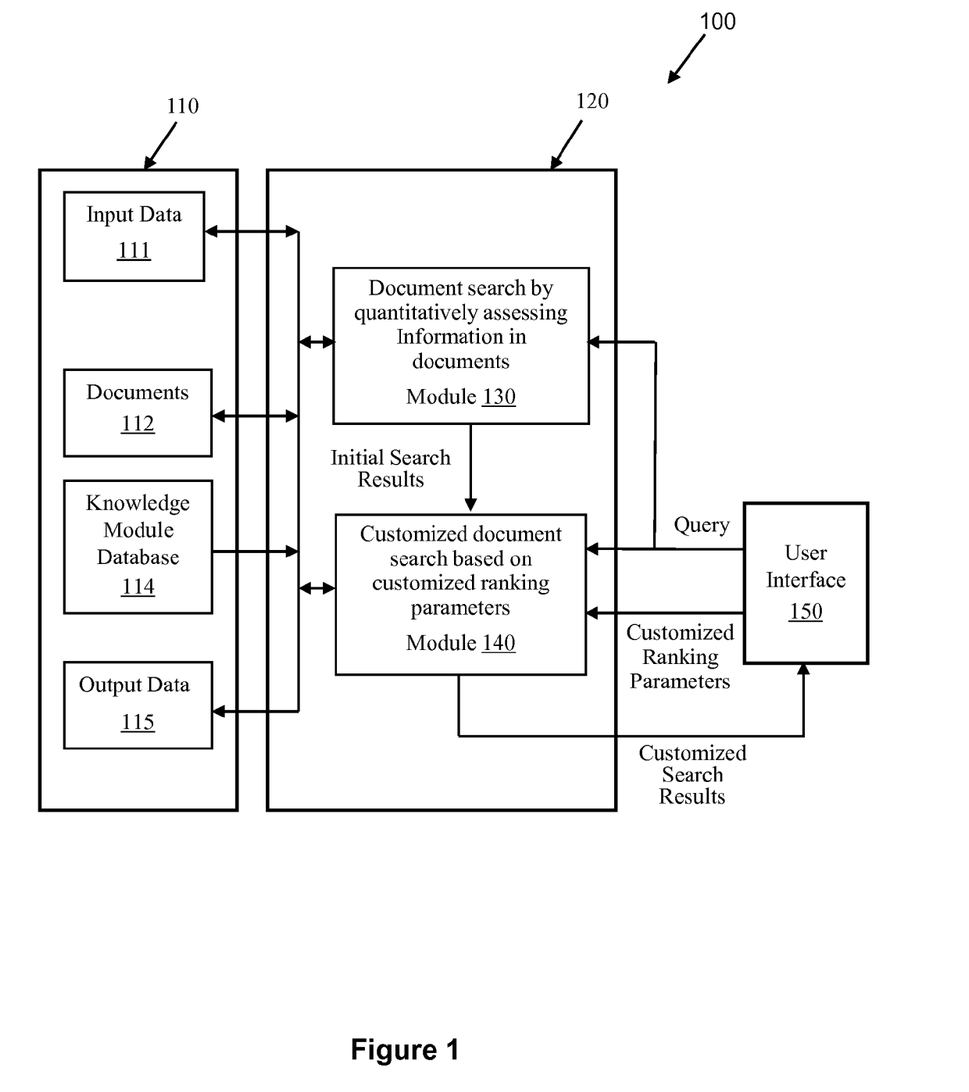
FIG. 1 is an exemplified system diagram in accordance with the present invention.

Referring to FIG. 1, a system 100 for document search/retrieval includes a computer storage system 110, a computer processing system 120, and a user interface 150. The computer storage system 110 can store input data 221 that can include a query string, an object name related to a query, and as described in more detail below, values of customized ranking parameters received from a user. The computer storage system 110 stores a collection of documents 112 comprising one or more documents, a knowledge module database 114, and output data 115 that include search results and optionally, related customized search criteria. The computer storage system 110 can also include optionally a syntactic parser (not shown) to assist the operations of module 130 as described in detail in the above referenced U.S. patent application Ser. No. 12/573,134.

Figure 2:
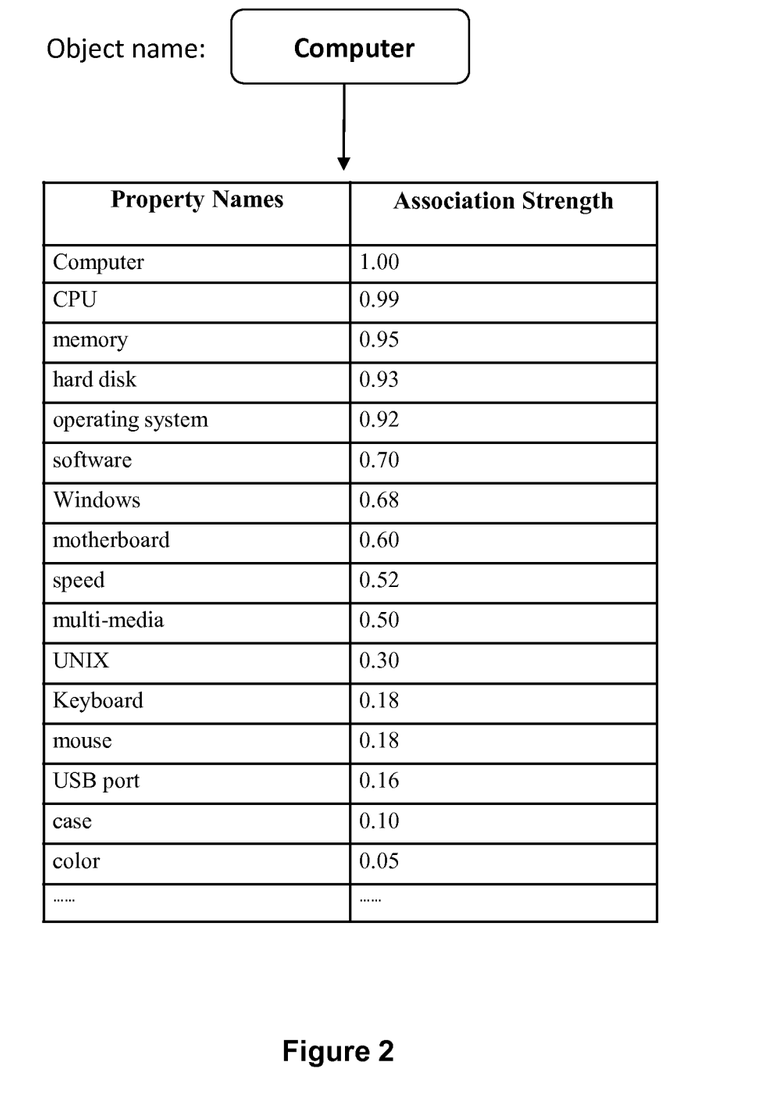
FIG. 2 illustrates an exemplified data table in a knowledge module.

The knowledge module database 114 can include a data table, as shown in FIG. 2, related to an object name defined in a query. In particular, the data table in FIG. 2 represents knowledge about the object of "computer". The object named "computer" is characterized by a plurality of associated properties such as "CPU", "memory", "hard disk", "operating system", "software", "windows", "motherboard", "speed", etc., that are associated with the object "computer". The prominence of the association between "computer" and each of the properties is characterized by a numerical value herein called association strength. Hypothetical values for the association strengths for "CPU", "memory", "hard disk", "operating system", can for example respectively be 0.99, 0.95, 0.93, and 0.92. A higher association strength value can represent a stronger association between the property and the object. The object "computer" can be uniquely defined by the associated properties and their respective association-strength values. The association-strength value for a property is specific to the object, and usually varies for different objects. For example, the property "color" may have an association-strength value of 0.8 for the object "flower", but an association-strength value of 0.05 for the object "computer". Moreover, the object "computer" can also be viewed as a property to itself with an association strength value equal to 1, or in some case a different value.

The computer processing system 120 can optionally include a functional module 130 that can quantitatively assess information in natural language contents in the documents using the same knowledge module, and can rank documents in the search result according to the quantitative measure of information in the documents. Detailed operations for the module 130 are disclosed in the above referenced U.S. patent application Ser. No. 12/573,134. For example, the query received from the user interface 150 can include an object name which can be in the form of a word, a list of words or a phrase, a character string, a sub-component of such string. A document stored in document 112 in the computer storage system 110 can be assessed to quantitatively determine its information content related to the object name in the query. Each sentence in the documents can be parsed and tokenized. The association strengths of tokenized words can be determined using a data set stored in the knowledge module database 114. A sentence information index is calculated using the association strengths of tokenized words in the sentence. A document information index is calculated using the sentence information indices of the sentences in the document.

Figure 3:
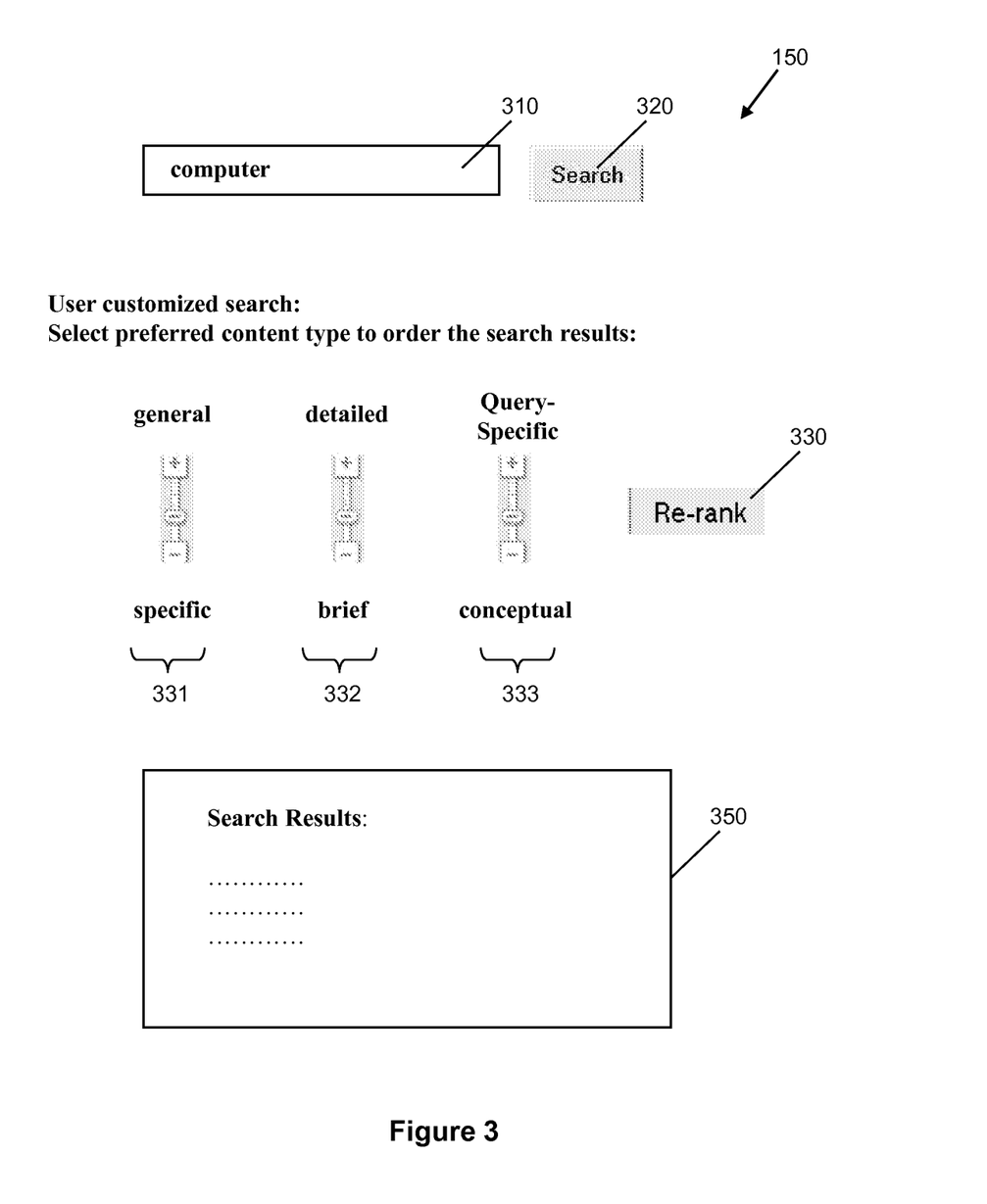
FIG. 3 illustrates an exemplified user interface for inputting customized ranking parameters.

The user interface 150, as shown in FIG. 3, can include a data field 310 for receiving a query string, which can be or include an object name such as "computer". A search button 320 for a user to activate an initial search to be performed by the module 130. The user interface 150 also includes a plurality of controls 331-333 for receiving values of customized ranking parameters from the user. For example, the control 331 can be a slider that allows a user to indicate whether he or she wants contents with general (or specific) information related to the query to be ranked higher in the search results. The control 332 can be implemented as a slider that allows a user to select whether he or she wants the detailed or brief contents to be ranked higher in the search results. The control 333 can be implemented as a slider that allows a user to indicate whether he or she wants the contents that are specific to the query term or other contents that are conceptually related to the queried object to be ranked higher in the search results. The selections by the user using the controls 331-333 are translated to values of customized ranking parameters and sent to the computer processing system 120. Customized search results can be listed in an area 350 according to the document's information content as well as content characteristics indicated by the values of the customized ranking parameters input from the control 331, and/or the control 332, and/or the control 333.

Figure 4:
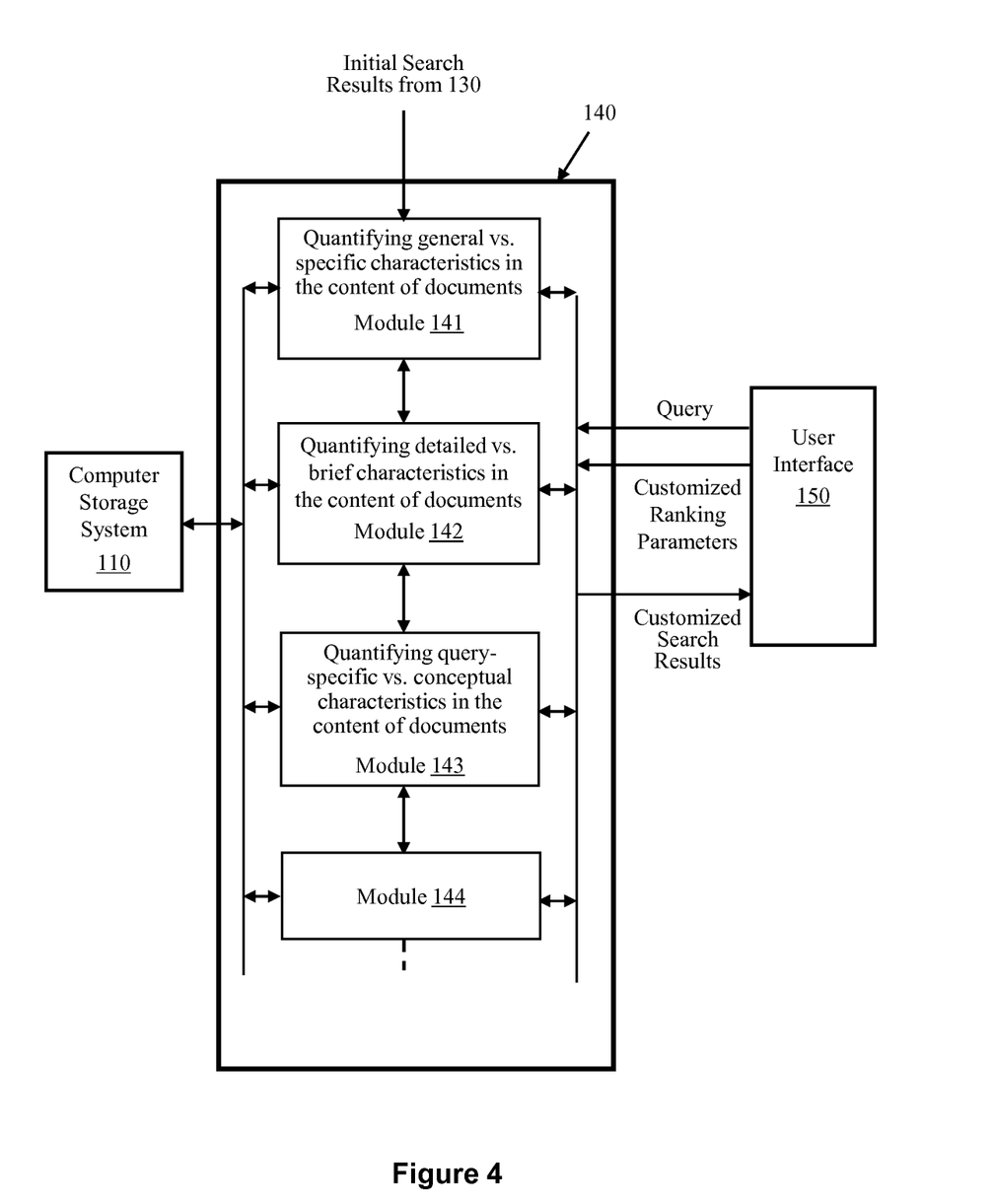
FIG. 4 illustrates details of a module for customized document search based on customized ranking parameters.

The computer processing system 120 includes a module 140 that can, as shown in FIG. 4, conduct customized searches and ranking of documents using the customized ranking parameters and a query received from the user at the user interface 150. The module 140 can conduct document content characteristics assessment and ranking for the documents stored in the computer storage system 110 or only for the documents in the initial search results obtained by the module 130. In other words, the module 140 can receive query directly from the user interface 150 and conduct customized search on documents stored in documents 112 using the data tables stored in the knowledge module database 114. An initial search by the module 130 is optional.

Referring to FIGS. 1 and 4, the module 140 can include a plurality of modules 141-143 for quantitatively assessing characteristics in the content of the documents. For example, the module 141 can quantitatively assess and determine a relevance score for each document based on how general or specific the information in the document is about the queried object. The module 142 can quantitatively assess and determine a relevance score for each document based on how detailed or brief the content of the document is in relation to the object name in the query. The module 143 can quantitatively assess and determine a relevance score for each document based on how much the content of the document is specifically about the queried object, or is only conceptually related to the queried object. The module 140 can also include other modules (e.g. 144 etc.) that can assess and rank documents based on other desirable content characteristics.

The modules 141-143 utilize the quantitative association strengths of the property terms related to an object name stored in the data tables as described above with reference to FIG. 2. The modules 141-143 quantitatively assess the characteristics of the content in a document by measuring distribution patterns of property terms in the document, based on research conducted by the present inventor that different content characteristics are related to different distribution patterns of property terms. A relevance score can be given to a document in relation to each content characteristic and for a specific object name. The raw documents in a document collection or in an initial search results can be ranked and re-ranked to provide the user with a more preferred or a shorter list of search results.

User Customized Search: General Vs. Specific Topics in Document Content

As described above in relation to the user interface control 331 (FIG. 3) and the module 141 (FIG. 4), a characteristic for a document content is how general or how specific the document's content is about the queried topic. An example of a general content versus a specific content is like the following.

If the query is about the object of "computer", a general content contains information about the general properties of the object computer, such as the properties of having a CPU, an operating system, can do mathematical calculations and text processing, etc. A specific content contains concentrated information about specific properties of the object, such as the CPU internal memory capacity, speed of the front bus on the motherboard, software device drivers, etc. When querying for information about the object of computer, different users may have different preferences for general contents over specific contents, or vice-versa. Conventional search engines are not capable of determining whether a document's content is more general than the other in certain aspects, thus not capable of providing an option for the user to indicate his/her preference and customize the search parameters for this purpose.

Figure 5:
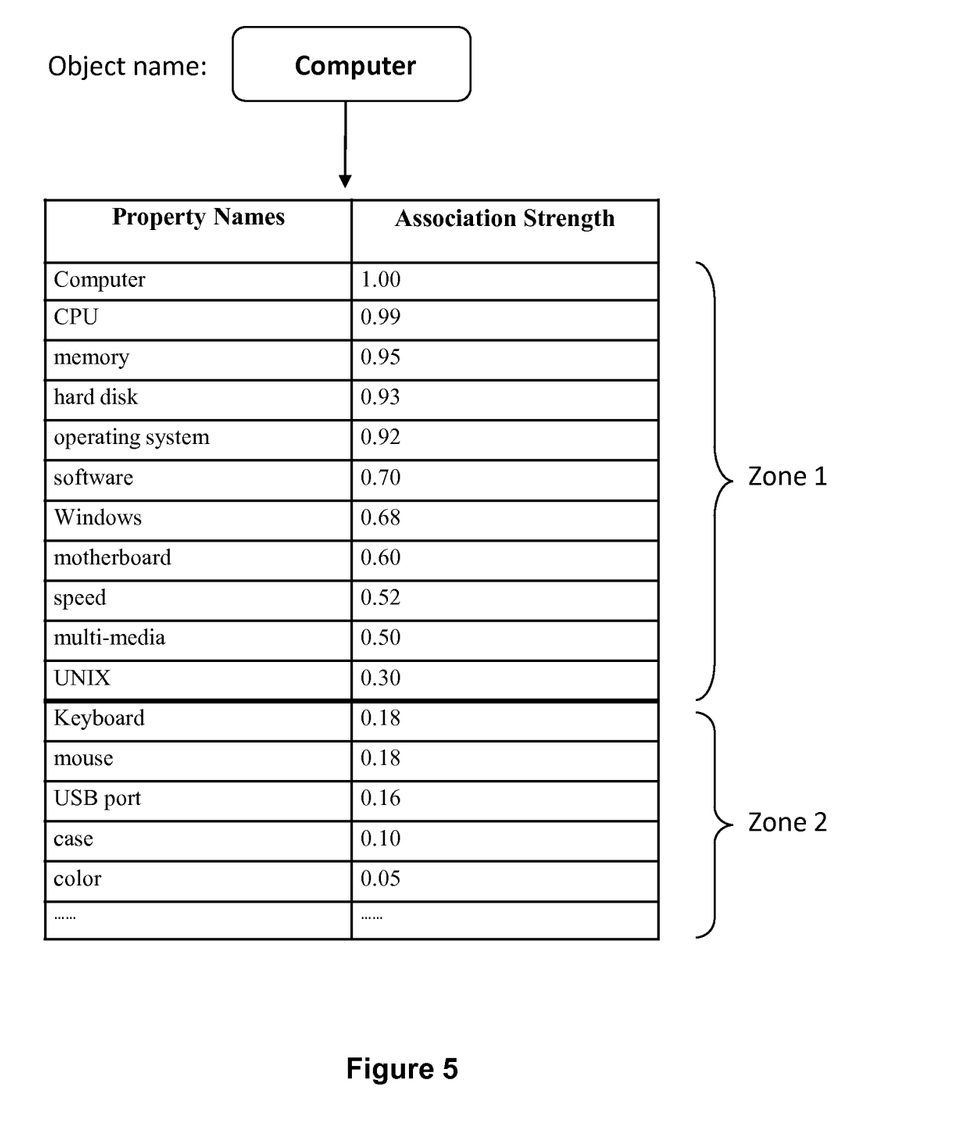
FIG. 5 illustrates the definition of zones using the exemplified data table of FIG. 2 in relation to the general vs. specific type of document content.

The control 331 in the user interface 150 (FIG. 3) allows a user to indicate whether he/she wants general contents or specific contents to be ranked higher in the returned search result, FIG. 5 illustrates an exemplified process. The property names and their associated association strength values related to an object name such as "computer" are separated into zones. In an exemplar embodiment, the property terms in the table are divided into two zones, such as "zone 1" and zone 2". The criteria for zone division can vary. In one example, a first zone includes property terms that have association strength values higher than 0.2. A second zone includes those property terms that have association strength values below 0.2. The logic behind this method is that based on research conducted by the present inventor, higher valued properties are more likely associated with the general aspects of the object, while lower valued properties, especially when they are the only ones mentioned, are more likely associated with specific aspects of the object. For example, a general discussion about computer may often mention the property names "CPU", "memory", and "operating system" etc., which are of high association strength values as shown in FIG. 5.

For a given document that contains property terms associated with the queried object, the total number of terms in the document that match the terms in the first zone of the knowledge data table is counted and the value of the counting is stored in a variable called zone_1_count. Then, the total number of terms that match the terms in the second zone of the knowledge data table is counted and stored in a variable called zone_2_count. A third variable zone_ratio is defined as follows:

$$\text{zone\_ratio} = \text{zone\_1\_count}/(\text{zone\_1\_count} + \text{zone\_2\_count}) \quad \text{Eqn. (1)}$$

For a document that contains at least one property term, the value of zone_ratio can range between 0 and 1. If the zone_ratio value is closer to 1, it is interpreted that the document's content is more likely about the general aspects of the object name. If the value is closer to 0, it is interpreted that the document's content is more likely about the specific aspects of the object, or not so much about the object.

It should be noted that zone_ratio can be calculated with other methods. For example, the frequency count of each property name can be multiplied by its association-strength value to produce a weighted frequency count for that property name. The weighted frequency counts can be summed up for the property names in zone 1 to produce zone_1_count, and for zone 2 to produce zone_2_count. Eqn. (1) can still be used to compute zone_ratio. Furthermore, the data table can be divided into more than two zones; and ratios between different zones and/or between combinations of multiple zones can also be used to indicate the content characteristics, whether in terms of general information vs. specific information, or other characteristics of the content.

It should also be noted that the term "count" or "counting" can include a single occurrence, at least one occurrence, or multiple occurrences of a property name. For example, zone_1_count can simply capture the number of distinct property names that exist in the document instead of counting the total occurrences, or multiple occurrences for each of the property names.

In some embodiments, a variable named w1 is defined to contain the value of a customized ranking parameter related to the degree of generality or specificity of the document topics. When the user selects a slider position in the control 331 in the user interface 150 (FIG. 3), a value is assigned to w1. A high slider position means that the user wants to find documents that more likely include the general content related to the object. Likewise, a low position in 331 indicates that the user wants to find documents that more likely include the specific content related to the object. For example, values of 1, 0.5 and 0 are respectively assigned to the variable of w1 corresponding to the high, mid, and low positions.

A relevance score is represented by a variable called general_content_rank_score. The value of general_content_rank_score is then calculated as a function of the value of w1 and the zone_ratio score of the document.

The following is an example of a discrete function that determines the value of the general_content_rank_score as a function of the user-determined variable w1, and the zone_ratio score of the document. The example is represented in a pseudo-code format, known for persons skilled in the art of basic computer programming.

EQN. (2)
```
If w1 = 1 then general_content_rank_score = zone_ratio (no change)
If w1 = 0.5 then
    If zone_ratio >= 0.667 then
        general_content_rank_score = zone_ratio - 0.667
    If zone-ratio <0.667 and zone_ratio >= 0.334 then
        general_content_rank_score = zone_ratio + 0.334
    If zone-ratio < 0.334 and zone_ratio >= 0 then
        general_content_rank_score = zone_ratio + 0.334
    end if
end if
If w1 = 0 then
    If zone-ratio >= 0.667 then
        general_content_rank_score = zone_ratio - 0.667
    If zone-ratio < 0.667 and zone_ratio >= 0.334 then
        general_content_rank_score = zone_ratio - 0.334
    If zone-ratio < 0.334 and zone_ratio >= 0 then
        general_content_rank_score = zone_ratio + 0.667
    end if
end if
```

The principle behind the function is to assign a high ranking score to a document that has a low zone_ratio score if the user indicates that a specific content is preferred to be ranked higher than a general content, and vice-versa.

When the control 331 is the only option enabled in the user interface, documents can be ranked or re-ranked according to the values of the general_content_rank_score for each document in descending order.

User Customized Search: Detailed Vs. Brief Contents in Documents

As described above in relation to the control 332 (FIG. 3) and the module 142 (FIG. 4), another characteristics of a document content is about the depth of the information the document contains about the queried topic. There are times when a user only wants to look for some brief information about an object. Sometimes a user wants to gather detailed information about the object. While documents can be of different lengths, a long document may not necessarily contain more relevant content than a shorter document. It is the relevant information in the content that matters. Conventional methods may not be able to determine whether a long document contains more relevant content than a short one.

In the present disclosure, a variable called term_depth_score is computed for each property term and for the document. In some embodiments, this score can be the frequency of the property term in that document. A variable total_depth_score is calculated by summing up the individual term_depth_score for different property names in the document. A pre-determined upper bound value of total_depth_upper_bound is used to limit the values of total_depth_score of individual documents to a finite range. The total_depth_score is capped at the total_depth_upper_bound. For the value of the total_depth_score exceeding the total_depth_upper_bound, the value of the total_depth_score is assigned to be the same as the total_depth_upper_bound. In an example, the total_depth_upper_bound is pre-selected to be 500. The total_depth_score is calculated by counting the frequency of the terms in the document that match the property names in the date table (FIG. 2). The property names used in the date table can be pre-selected, for example, by setting a threshold for the association strengths. The threshold value for the association strengths of the property names in the data set can for example be 0.01, 0.05, or 0.1. The total terms in the document that match the property names in the table with their association strength values higher than 0.1 are counted up to 500 in this example. If the count reaches 500, it is assumed that the document contains quite detailed description about the queried object.

A variable depth_ratio is defined in the following formula:

$$depth\_ratio = total\_depth\_score / total\_depth\_upper\_bound \quad \text{Eqn. (3)}$$

The range of depth_ratio will be between 0 and 1 because the total_depth_score is capped by total_depth_upper_bound as described above. If the value is closer to 1 then it is interpreted that the document is likely to contain an in-depth or comprehensive coverage about the queried object, and if the value is closer to 0 then it is interpreted that the document is likely to contain only a brief or even no coverage about the queried object.

In connection to the first characteristic relating to the general or specific nature of a document's content, a document comprising detailed discussions about the object tends to mention many relevant property names, but the information can be either general or specific about the object, depending on which zone the mentioned property names are located in as shown in FIG. 5 and discussed above. Likewise, a document comprising brief discussions about the queried object tends to mention fewer relevant property names, but the information can be either general or specific about the object, depending on which zone the mentioned property names are located in as shown in FIG. 5.

In the same way as with the general vs. specific search parameter above, a variable of w2 can be defined, and values of 1, 0.5 and 0 can be respectively assigned to the variable of w2 corresponding to the high, mid, and low positions of the user interface control 332.

A relevance score is represented by a variable called content_depth_rank_score. The value of content_depth_rank_score is then calculated for each document as a function of the value of w2 and the depth_ratio_score of the document.

A function the same as or different from eqn. (2) can be used to calculate the values of content depth_rank_score for each document.

When the control 332 is the only option enabled in the user interface, documents can be ranked or re-ranked according to the values of the content depth_rank_score for each document in descending order.

User Customized Search: Query-Specific Topics Vs. Conceptually Related Topics in Document Content As described above in relation to the control 333 (FIG. 3) and the module 143 (FIG. 4), another characteristics of a document content describes whether a document's content is specifically about an queried object or may be about other objects that are conceptually related to the queried object. For example, if the queried object is "desktop computer", certain properties of a desktop computer can also be properties of "notebook computer", such as the hardware components and operating systems, etc. Thus, document about "notebook computer" may also contain information that is relevant and useful to a query on "desktop computer".

There are times when a user only wants to search for information specifically about the queried object, but there may also be times when the user may want to also look at documents that are conceptually related to the queried object, such as the case how "notebook computer" is related to "desktop computer". Conventional methods may not be able to determine whether a document that does not contain the object name contains relevant content about related objects or not. For example, conventional methods may not be able to determine whether a document in which the term "desktop computer" does not occur may to also contain relevant information about "desktop computer", such as in a document about "notebook computer".

The present disclosure provides tools for customized searches to allow a user to adjust the degree of "query-term search" vs. "concept search" in his or her search. A search with emphasis on the exact match of the object name or keyword in a query can retrieve documents in which the object name plays a determining role. A concept-based search may also retrieve documents that contain information that is conceptually related to the object name even the object name itself is not the focus of the content. The present disclosure provides a method for the user to indicate his or her preference for query-specific search or concept search; and to flexibly adjust the ranking of search results using the control 333 (FIG. 3).

In the presently disclosed methods, a variable called keyword_prominence_score stands for the prominence score of the keyword in the document. A variable called property_terms_prominence_score stands for the prominence score of the property terms in the document. In an example, the prominence score of the keyword and the property terms can be computed by their respective frequencies of such terms in the document. (It should be noted that other quantitative measures of the two prominences can be used without deviating from this principle of the present invention). A parameter called keyword_properties_ratio is defined in the following formula:

$$keyword\_properties\_ratio = keyword\_prominence\_score/(keyword\_prominence\_score + property\_terms\_prominence\_score) \quad \text{Eqn. (4)}$$

In the present disclosure, as shown in FIGS. 2 and 5, the queried object name or the keyword itself can be viewed as a property term. For the document that contains at least one keyword or one property term, the range of the keyword_properties_ratio is between 0 and 1. A value of keyword_properties_ratio closer to 1 can be interpreted as that the document is specifically about the queried object. A value of keyword_properties_ratio closer to 0 can be interpreted as that the document may be about other objects that are conceptually related to the queried object.

It should be noted that other methods of measuring the content's specificity of the query-term can also be used instead of the ratio between the keyword count and the property terms count. The keyword count can be replaced by a keyword prominence score that may be calculated based on the different positions of the keyword in sentences, paragraphs and/or the document. And the property terms count can be treated in the same way, as well as using different weights based on the association strength of each property term.

In the same way as with the general vs. specific search parameter above, a variable of w3 can be defined, and values of 1, 0.5 and 0 can be respectively assigned to the variable of w3 corresponding to the high, mid, and low positions of the user interface control 333.

A relevance score is represented by a variable called keyword_focus_rank_score. The value of keyword_focus_rank_score is then calculated for each document as a function of the value of w3 and the keyword_properties_ratio score of the document.

A function the same as or different from eqn. (2) can be used to calculate the values of keyword_focus_rank_score for each document.

When the control 333 is the only option enabled in the user interface, documents can be ranked or re-ranked according to the values of the keyword_focus_rank_score for each document in descending order.

It should be noted that in addition to the above three exemplar parameters and the corresponding user interface objects, other customized search adjustment parameters and corresponding user interface objects can be used based on the principle of analyzing the distribution patterns of the property terms in the document without deviating from the spirit of the present invention.

Figure 6:
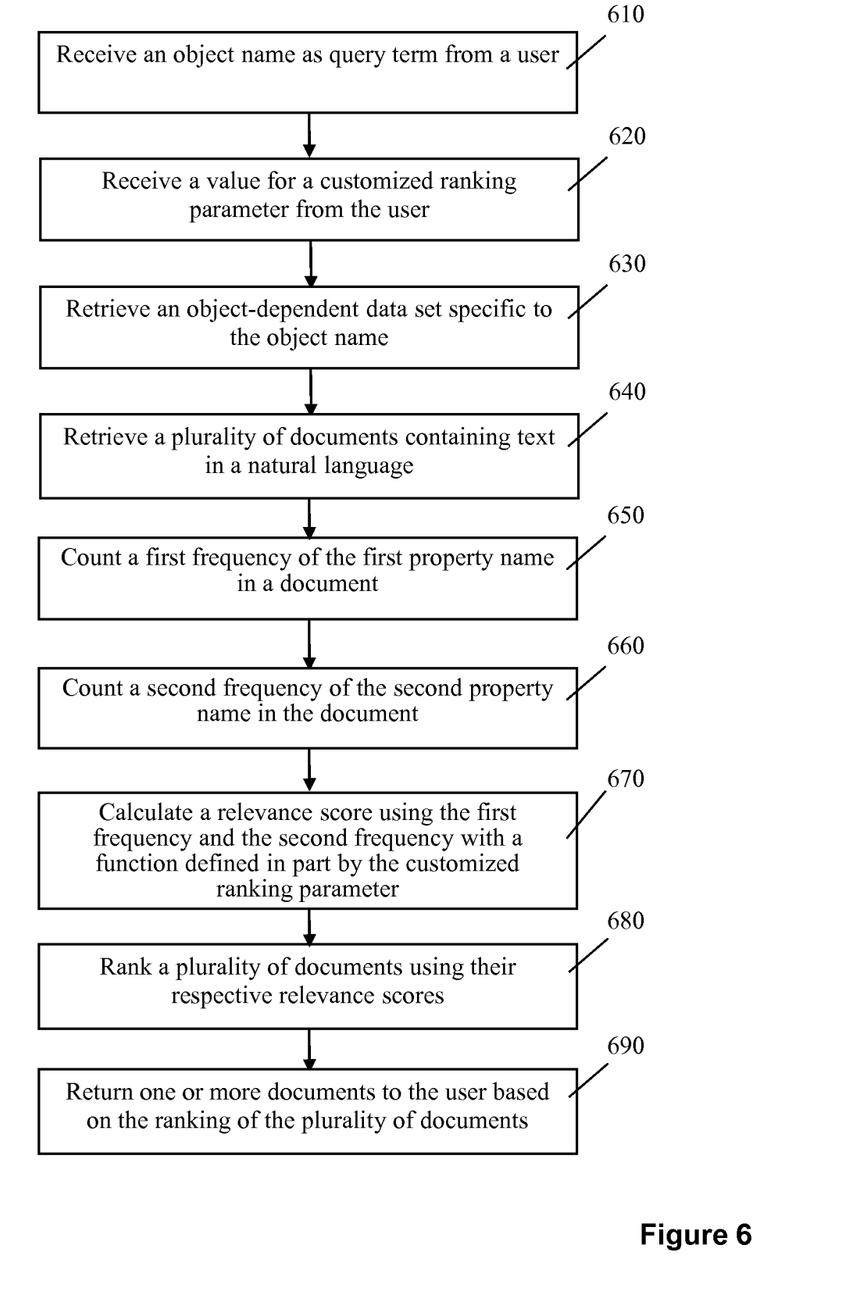
FIG. 6 is a flowchart for the customized search in accordance with the present invention.

FIG. 6 shows a flowchart for the customized search in accordance with the present invention. An object name is received as a query term from a user at the user interface (e.g. 150 FIGS. 1, 3, and 4) (step 610). The user can set values for a customized ranking parameter using controls 331-333 at the user interface (e.g. 150, FIG. 3) (step 620). These values are sent to a computer processing system (e.g. 120, FIGS. 1, 4). The computer processing system retrieves an object-specific data set related to the object name from a computer storage system (FIGS. 1, 4) (step 630). The object-specific data set includes a plurality of property names and association-strength values. Each property name is associated with an association-strength value. The property names include a first property name and a second property name. A plurality of documents containing text in a natural language are stored in a storage system and retrieved by the computer processing system (FIGS. 1, 4) (step 640).

The computer processing system counts a first frequency of the first property name in one of the documents (step 650). The computer processing system can also count a second frequency of the second property name in the document (step 660). For example, in the above describe section "User customized search: general vs. specific topics in document content", the computations of zone_1_count and zone_2_count can involve the counting frequencies of property names in zone 1 and zone 2 respectively (FIG. 5). Similarly, the calculation of total_depth_score, as described above, also involves the counting of property names listed in the data table in a document. For user customized search related to query-specific topics vs. conceptually related topics in document content, the computations of keyword_prominence_score and property_terms_prominence_score also involve counting of frequencies of the object name and other property names in the document.

The computer processing system then calculates a relevance score as a function of the first frequency and the second frequency (step 670). As shown in Eqns. (1-3) above, variables such as zone_ratio, depth_ratio, and keyword_properties_ratio are first calculated using the first frequency and the second frequency (among possibly frequencies of other property names). Then the relevance score such as general_content_rank_score is calculated, as shown by eqn. (2) above, a function that is in part defined by the customized ranking parameter (w1).

The plurality of documents in the document collection are then ranked using their respective relevance scores (step 680). The one or more documents in the ranked documents can be returned to the user based on the ranking of the plurality of documents (FIGS. 1, 3, 4) (step 690).

User Customized Search: Combining Multiple Parameters

Referring back to FIG. 3, the controls of 331-333 can for example each include three pre-set positions: high, mid, and low for each slider. In combination, the three positions in each of the controls 331-333 can provide a user up to 27 different options for customized searches.

As has been described above in detail, in an exemplar embodiment, values of variables w1, w2, and w3 can represent the user preference for general content, content depth, and keyword_focus. Depending on the user-determined values of such variables, documents with different content characteristics parameter values are assigned different ranking scores. For example, if the user prefers the concept-based content over keyword-based content, a document with a low-valued keyword_properties_ratio will be assigned a high ranking score. The same is also the case with other content characteristics parameters.

When only one of the three parameters is enabled in the user interface, documents can be ranked or re-ranked according the values of one of the ranking scores that is enabled in the user interface.

When two or more customized ranking parameters are enabled in the user interface, a variable named adjusted_document_rank_score is defined, and a function such as exemplified by Equation (5) below, can combine the values of the rank scores of each parameter, and produce an adjusted_document_rank_score for each document, and all documents can be ranked and re-ranked according to their adjusted document rank score.

An exemplified function for calculating the adjusted document rank score can be the following:

$$adjusted\_document\_rank\_score = general\_content\_rank\_score + content\_depth\_rank\_score + keyword\_focus\_rank\_score \quad \text{Eqn. (5)}$$

If each of the variables of general_content_rank_score, content_depth_rank_score, keyword_focus_rank_score has a range between 0 and 1, the adjusted_document_rank_score can have a range between 0 and 3. A normalization factor can be added to normalize the adjusted_document_rank_score to a range between 0 and 1.

The value of adjusted_document_rank_score represents an overall relevance score for the document taking into account the values of all three customized ranking parameters determined by the user, which can be used to rank documents in a collection. The higher ranked documents can be returned to the user first and displayed in the area (350, FIG. 3) as the search results in response to the three customized ranking parameters set from the controls 331-333.

It should be understood that the above-described methods are not limited to the specific examples used. Configurations and processes can vary without deviating from the spirit of the invention. For example, additional parameters other than the ones described above can be used to reflect other characteristics of the document content. For example, the total number of well-formed sentences in the document, together with the total number of incomplete sentences in the document can also be obtained to indicate whether the content of a document is descriptive in nature or may just be a list in style such as a directory or table of content page. Other user interface methods can be used instead of the examples provided above. The values that are received from the user interface controls can be continuous or discrete, in different value ranges, and with other than three levels. Other characteristics of the document content can be analyzed by utilizing the object-specific data set. Other adjustment functions can also be used, and other functions for calculating the adjusted document score can also be used, all without deviating from the spirit of the present invention.

What is claimed is:

1. A system for searching documents and ranking search results based on conceptual association, comprising:
a computer; configured to store one or more datasets each being related to an object or concept, and to store a plurality of documents each comprising one or more words or phrases, wherein each dataset comprises one or more words or phrases as names of properties associated with the object or concept,
to receive a query, wherein the query comprises a word or a phrase that represents an object or concept name,
to retrieve a dataset related to the object or concept name in the query, the dataset including a first property name and one or more second property names,
to count a first frequency of the first property name in one or more of the plurality of documents, and a second frequency of the one or more second property names in the one or more documents, and to calculate a relevance score for the one or more documents as a function of at least the first frequency and the second frequency, and
to output the one or more documents or their representations as a search result based on the relevance score, wherein each of the one or more documents contains at least one word or phrase that matches a property name in the dataset, but does not match the word or phrase in the query.

2. The system of claim 1, further comprising:
a user interface configured to accept a query containing one or more concept names, and to accept a user indication to initiate a concept-based search.

3. The system of claim 2, wherein the user interface is further configured to display a label indicating that the search can be based on concept or association.

4. The system of claim 2, wherein the user interface is further configured to accept a customized ranking parameter for ranking the search results based on the content characteristics of the documents.

5. The system of claim 4, wherein the types of the document content characteristics includes at least a general contents versus a specific content, a brief content versus a comprehensive content, and a keyword-focused content versus a conceptually-associated content,
wherein the general content or the specific content is defined based on whether the content contains top N property names from a list of property names ranked by the strength of association,
wherein the brief content or the comprehensive content is defined based on whether the document content contains more than a pre-defined amount of terms representing properties associated with the object or concept,
wherein the keyword-focused content or the conceptually-associated content is defined based on whether the content is retrieved based more on terms that match the object or concept name than on terms that do not match the object or concept name but represent properties associated with the object or concept.

6. The system of claim 4, wherein the computer is further configured to receive the customized ranking parameter, and to calculate the relevance score as a function of the first frequency, the second frequency, and the customized ranking parameter.

7. The system of claim 1, wherein the first property name or one of the one or more second property names in the dataset is further associated with a numerical value, wherein the numerical value represents the association strength between the property and the concept or object, wherein the function for calculating the relevance score is further based on the numerical value.

8. The system of claim 7, wherein the numerical value is above or below a predetermined threshold value.

9. The system of claim 7, wherein the function further depends on a first multiplication of the first frequency and its corresponding numerical value; and a second multiplication of the second frequency and its corresponding numerical value.

10. The system of claim 1, wherein the first property name is the same as the object or concept name in the query, and the one or more second property names are different from the object or concept name in the query, wherein the computer is configured to calculate the relevance score further based at least on the relationships between the first frequency and the second frequency.

11. The system of claim 10, wherein the computer is further configured to sum the frequencies of property names that are different from the object or concept name in the document to produce a total count, and to calculate the relevance score using a ratio of the first frequency to the sum of the first frequency and the total count.

12. The system of claim 11, wherein the relevance score is used to determine the degree of the document content characteristics in terms of being a keyword-focused content in contrast to a conceptually associated content, wherein the computer is further configured to rank or re-rank the documents based on the characteristics, wherein the keyword-focused content or the conceptually-associated content is defined based on whether the content is retrieved based more on the terms that match the object or concept name than on the terms that do not match the object or concept name but represent properties associated with the object or concept.

13. The system of claim 1, wherein the computer is further configured to:
count the frequencies of the plurality of property names in the one or more of the plurality of documents;
sum the frequencies of property names to produce a total count in the one or more of the plurality of documents; and
calculate the relevance score for the one or more of the plurality of documents based on the total count.

14. The system of claim 13, wherein the frequencies of the plurality of property names is counted up to a predetermined upper bound, wherein the relevance score is calculated using a ratio of the total count to the predetermined upper bound, wherein the total count is set to be equal to the predetermined upper bound if the total frequencies of the plurality of property names exceed the predetermined upper bound.

15. The system of claim 13, wherein the relevance score is used to determine the degree of the document content characteristics in terms of being a brief content in contrast to a comprehensive or detailed content, wherein the computer is further configured to rank or re-rank the documents based on the characteristics, wherein a brief content or a comprehensive or detailed content is defined based on whether the document content contains more than a pre-defined amount of terms representing properties associated with the object or concept.

16. The system of claim 7, wherein the computer is further configured to separate the plurality of property names in the dataset into a first group and a second group, wherein the numerical value associated with each of the property names in the first group is at or above a predetermined value, wherein the numerical value associated with each of the property names in the second group is below the predetermined value, wherein the computer is further configured to count the frequencies of the property names in the first group and count the frequencies of the property names in the second group in the one or more of the plurality of documents, wherein the computer is further configured to calculate the relevance score as a function of the frequencies of the property names in the first group and the frequencies of property names in the second group.

17. The system of claim 16, wherein the relevance score is used to determine the degree of the document content characteristics of containing general information in contrast to containing specific information about the object or concept, wherein the computer is further configured to rank or re-rank the documents based on the characteristics, wherein the document content characteristics of containing general information or containing specific information is defined based on whether the document content contains top N property names from a list of property names ranked by the strength of association.

18. The system of claim 16, wherein the computer is configured to sum the frequencies of the one or more property names in the first group in the document to produce a first sum and to sum the frequencies of the one or more property names in the second group in the document to produce a second sum, where the relevance score is calculated based on the first sum and the second sum, wherein the relevance score is used to determine the document content characteristics of containing general information in contrast to containing specific information about the object or concept, wherein the computer is further configured to rank or re-rank the documents based on the characteristics, wherein the document content characteristics of containing general information or containing specific information is defined based on whether the document content contains top N property names from a list of property names ranked by the strength of association.

19. A computing system for searching documents, comprising:
a computing device; configured to receive a plurality of documents from a storage, and a query comprising a keyword, and a first user indication for a concept-based search, and to perform the concept-based search by:
(a) receiving a query, wherein the query comprises a word or a phrase that represents an object or concept name,
(b) obtaining a dataset based on the name of the concept or object, wherein the dataset comprises one or more terms representing one or more properties associated with the concept or object,
(c) identifying a first term in the plurality of documents, wherein the first term does not match the keyword in the query, wherein the first term matches one of the one or more terms in the dataset, and
(d) returning at least one of the plurality of documents containing the first term as a search result.

20. The system of claim 19, wherein the computing device is further configured to provide a user interface object to indicate that the concept-based search is an available search option, wherein the interface object is associated with a label, wherein the label is a text representing the meaning of "concept" or "association",
to receive a second user indication for a keyword-based search, and
to provide an adjustable scale to receive a user preference towards either the concept-based search or the keyword-based search, wherein the computing device is further configured to use the scale value as a searching or ranking parameter.

* * * * *